(12) United States Patent
Ogasawara (10) Patent No.: US 9,485,436 B2
(45) Date of Patent: Nov. 1, 2016

(54) IMAGE PROCESSING APPARATUS AND IMAGE PROCESSING METHOD

(71) Applicant: CANON KABUSHIKI KAISHA, Tokyo (JP)

(72) Inventor: Tsutomu Ogasawara, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 327 days.

(21) Appl. No.: 14/139,355

(22) Filed: Dec. 23, 2013

(65) Prior Publication Data

US 2014/0184792 A1 Jul. 3, 2014

(30) Foreign Application Priority Data

Dec. 27, 2012 (JP) ................. 2012-285263

(51) Int. Cl.
*H04N 5/262* (2006.01)

(52) U.S. Cl.
CPC .................. *H04N 5/2621* (2013.01)

(58) Field of Classification Search
CPC .............. G03B 2217/005; G03B 5/00; G06K 2209/01
USPC ...................... 348/140, 239, 221.1
See application file for complete search history.

(56) References Cited

U.S. PATENT DOCUMENTS

| | | | | |
|---|---|---|---|---|
| 2002/0140823 A1* | 10/2002 | Sakurai | ................ | H04N 5/232 348/207.99 |
| 2005/0195317 A1* | 9/2005 | Myoga | ................ | H04N 5/23229 348/370 |
| 2006/0098970 A1* | 5/2006 | Sato | ................ | H04N 5/23212 396/121 |
| 2007/0229697 A1* | 10/2007 | Choi | ................ | H04N 5/2257 348/345 |
| 2007/0286520 A1* | 12/2007 | Zhang | ................ | G06K 9/00228 382/264 |
| 2009/0040321 A1* | 2/2009 | Nakamura | ......... | H04N 5/23232 348/208.11 |
| 2009/0109304 A1* | 4/2009 | Guan | ................ | H04N 5/23212 348/240.99 |
| 2009/0167928 A1* | 7/2009 | Asukabe | ................ | G03B 13/00 348/345 |
| 2010/0007759 A1* | 1/2010 | Watanabe | ............... | H04N 5/232 348/222.1 |
| 2011/0279699 A1* | 11/2011 | Matsui | ................ | H04N 5/20 348/222.1 |
| 2012/0307009 A1* | 12/2012 | Li | ................ | H04N 5/23229 348/46 |
| 2012/0320239 A1* | 12/2012 | Uehara | ................ | H04N 5/2621 348/239 |
| 2012/0321211 A1* | 12/2012 | Tsukagoshi | ........... | G06T 7/0002 382/255 |

FOREIGN PATENT DOCUMENTS

| | | |
|---|---|---|
| CN | 101276409 A | 10/2008 |
| CN | 101297545 A | 10/2008 |
| CN | 101527773 A | 9/2009 |
| CN | 101765862 A | 6/2010 |
| CN | 102547131 A | 7/2012 |
| JP | 2012-129627 A | 7/2012 |

* cited by examiner

*Primary Examiner* — Sath V Perungavoor
*Assistant Examiner* — Nathnael Aynalem
(74) *Attorney, Agent, or Firm* — Canon U.S.A. Inc., IP Division (57) ABSTRACT

An image processing apparatus includes a detection unit configured to detect an object from image data, a blurring processing unit configured to execute blurring processing on the image data based on a result of the detection by the detection unit, and a control unit configured to control whether to execute the blurring processing according to a distance difference in subject distance between an object area corresponding to the object detected by the detection unit and a background area other than the object area in the image data and a size of the background area.

12 Claims, 7 Drawing Sheets

| | | | S321 | | |
|---|---|---|---|---|---|
| BLUE | | | | | |
| BROWN | | PERSON | - - - - | | BROWN |
| GREEN | | ¦ | ¦ | | |
| | | ¦ - - - - - - | ¦ | | |
| | | | | | |
| BROWN | | | | | |

| X | X | X | 1 | X | X |
|---|---|---|---|---|---|
| 2 | 2 | 0 | 0 | 0 | 2 |
| 1 | 1 | 0 | 0 | 0 | 2 |
| 1 | 1 | 2 | 0 | 0 | 1 |
| 2 | 1 | 0 | 0 | 0 | 2 |
| 1 | 1 | 0 | 1 | 0 | 2 |

IMAGE PROCESSING APPARATUS AND IMAGE PROCESSING METHOD

BACKGROUND

1. Field

Aspects of the present invention generally relate to an image processing apparatus configured to generate image data with a blurring effect exerted on a background area of captured image data.

2. Description of the Related Art

It is known to execute blurring processing by image processing so that a similar level of a blur amount to that of a single-lens reflex camera having a large image sensor can be obtained with a digital camera having a relatively small image sensor. Japanese Patent Application Laid-Open No. 2012-129627 discusses a method in which whether execution of blurring processing is necessary is determined based on a depth difference between a main object and a background. In this method, when execution of blurring processing is determined to be unnecessary because there is no distance difference between the main object and the background, no blurring processing is executed.

However, an image may appear unnatural if blurring processing is not executed effectively according to a shooting scene.

SUMMARY

According to an aspect of the present invention, an image processing apparatus includes a detection unit configured to detect an object from image data, a blurring processing unit configured to execute blurring processing on a background area in the image data, the background area being other than an object area corresponding to the object detected by the detection unit, and a control unit configured to control the blurring processing unit to execute the blurring processing when the background area has a first size, and not to execute the blurring processing when the background area has a second size smaller than the first size.

Further features of the present disclosure will become apparent from the following description of exemplary embodiments with reference to the attached drawings.

BRIEF DESCRIPTION OF THE DRAWINGS

FIGS. 4 A, 4B, and 4C illustrate a method of blurring processing and combining processing according to the present exemplary embodiment.

DESCRIPTION OF THE EMBODIMENTS

Figure 1:
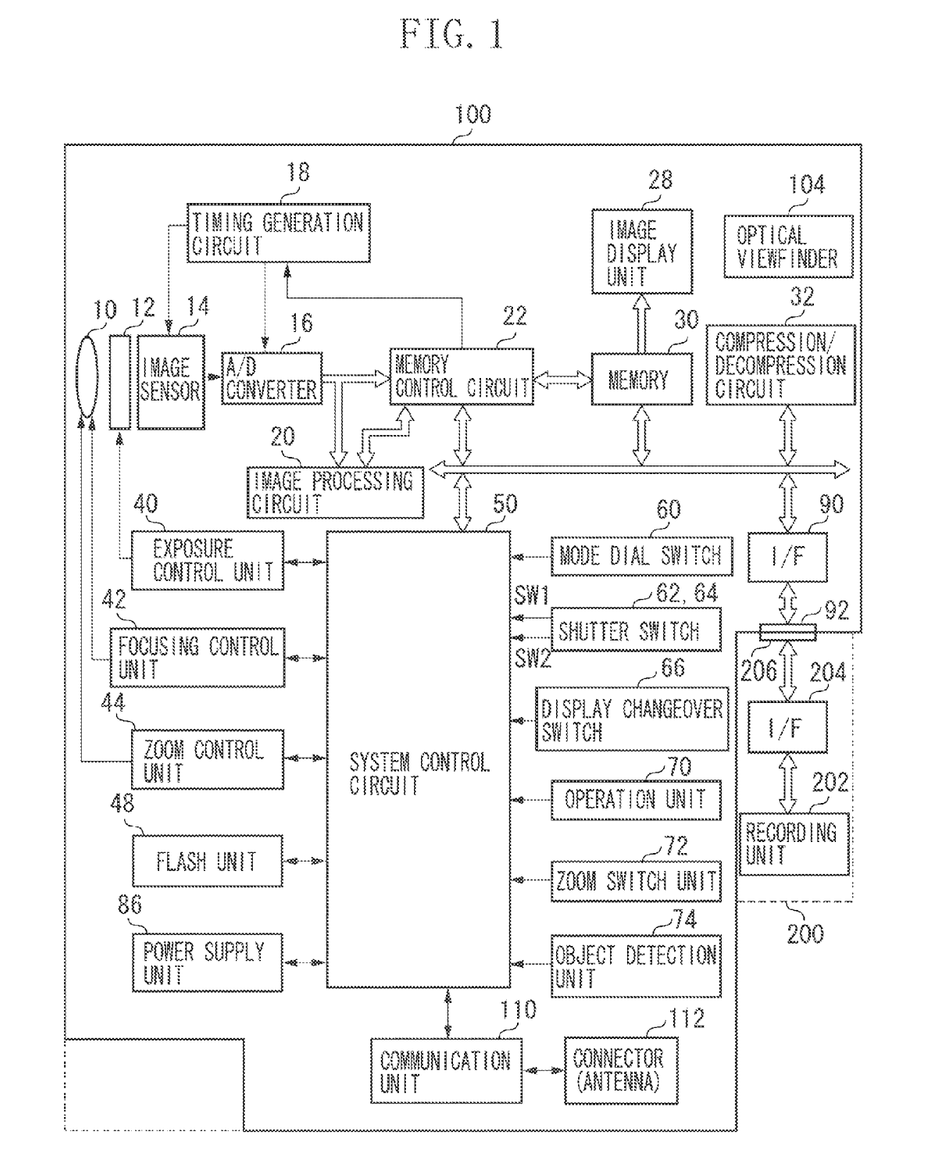
FIG. 1 is a view illustrating a configuration of a digital camera according to an exemplary embodiment.

FIG. 1 illustrates an image processing apparatus 100. The present exemplary embodiment will describe a configuration of a digital camera as an example of the image processing apparatus 100.

A shooting lens 10 includes a focusing lens. A mechanical shutter 12 has a diaphragm function. An image sensor 14 converts optical images entering from an optical system such as the shooting lens 10 and the mechanical shutter 12 into electrical signals. An analog-digital (A/D) converter 16 converts analog signal outputs of the image sensor 14 into digital signals.

A timing generation circuit 18 supplies clock signals and control signals to the image sensor 14 and the A/D converter 16. The timing generation circuit 18 is controlled by a memory control circuit 22 and a system control circuit 50. Besides the mechanical shutter 12, the timing generation circuit 18, which also functions as an electronic shutter, can control accumulation time by controlling reset timing of the image sensor 14. Such an electronic shutter can be used in moving image shooting and the like.

An image processing circuit 20 executes predetermined pixel interpolation processing and predetermined color conversion processing on data from the A/D converter 16 or data from the memory control circuit 22. Further, the image processing circuit 20 executes image segmentation and variable magnification processing to realize an electronic zoom function. Further, the image processing circuit 20 executes predetermined arithmetic processing using captured image data. Based on the obtained results of the arithmetic processing, the system control circuit 50 executes autofocus (AF) processing, autoexposure (AE) processing, and electronic flash (EF) control processing on an exposure control unit 40 and a focusing control unit 42. Furthermore, the image processing circuit 20 executes automatic white balance (AWB) processing. Further, the image processing circuit 20 includes an object detection circuit. A method for detecting an object is not particularly limited, and any publicly-known method can be used such as pattern matching and feature point extraction. While the present exemplary embodiment describes faces as an example of an object to be detected, an object to be detected is not particularly limited, and any other object (object area) may be detected by use of a publicly-known object detection method. In the present exemplary embodiment, the object detection circuit is a face detection circuit configured to output coordinates of face areas (area information), coordinates of eyes, etc. as output of detection results.

The memory control circuit 22 controls the A/D converter 16, the timing generation circuit 18, the image processing circuit 20, a memory 30, and a compression/decompression circuit 32. Data from the A/D converter 16 is written to the memory 30 either via the image processing circuit 20 and the memory control circuit 22 or via the memory control circuit 22.

An image display unit 28 includes a thin-film transistor (TFT) and a liquid crystal display (LCD). Display image data that has been written to the memory 30 is displayed on the image display unit 28 via the memory control circuit 22. Sequential displaying of captured image data by use of the image display unit 28 can realize an electronic finder function. Further, the image display unit 28 is capable of arbitrarily turning on/off display according to an instruction from the system control circuit 50. When the display is turned off, power consumption of the image processing apparatus 100 can be reduced significantly.

The memory 30 is configured to store captured still and moving images. The memory 30 has a sufficient storage capacity to store a predetermined number of still images and a predetermined period of moving images. This allows a large amount of images to be written to the memory 30 at high speed even in cases of continuous shooting and panoramic shooting in which multiple still images are continuously captured.

The memory 30 can also be used as a work area of the system control circuit 50.

The compression/decompression circuit 32 compresses or decompresses image data by adaptive discrete cosine transform (ADCT) or the like. The compression/decompression circuit 32 reads images stored in the memory 30, executes compression or decompression processing on the read images, and writes the processed images to the memory 30.

The exposure control unit 40 controls the mechanical shutter 12 having the diaphragm function. The exposure control unit 40 is linked to a flash unit 48 to have a flash control function.

The focusing control unit 42 is configured to control focusing of the shooting lens 10. A zoom control unit 44 is configured to control zooming of the shooting lens 10.

The flash unit 48 has an AF auxiliary light projection function and the flash control function. The exposure control unit 40 and the focusing control unit 42 are controlled using a through-the-lens (TTL) method. Based on the results of arithmetic processing executed on captured image data by the image processing circuit 20, the system control circuit 50 controls the exposure control unit 40 and the focusing control unit 42.

The system control circuit 50 controls the entire image processing apparatus 100.

Operation units 60, 62, 64, 66, 70 and 72 enable various types of operation instructions to be input to the system control circuit 50. The operation units 60, 62, 64, 66, 70 and 72 include a switch, a dial, a touch panel, a pointing device using eye tracking, a voice recognition device, etc., either singly or in combination of two or more.

The following describes the operation units in detail.

With the mode dial switch 60, a user can switch and set a function mode such as a power-off mode, an automatic shooting mode, a shooting mode, a high dynamic range (HDR) shooting mode, a panoramic shooting mode, a moving image shooting mode, a reproduction mode, and a personal computer (PC) connection mode.

The shutter switch SW1 62 is turned on while a shutter button is being operated, and gives an instruction to start operations such as the AF processing, the AE processing, and the AWB processing.

The shutter switch SW2 64 is turned on when the operation of the shutter button is completed. In the case of flash shooting, after EF preliminary emission processing is executed, the image sensor 14 is exposed for an exposure period determined in the AE processing. In the case of flash shooting, a flash is fired during the exposure period and then blocked by the exposure control unit 40 at the same time as the expiration of the exposure period to end the exposure of the image sensor 14. At the same time, initiation of operation of a series of processing up to recording processing in which signals read from the image sensor 14 are written to a recording medium 200 is instructed. Details of the processing include reading processing in which image data is written to the memory 30 via the A/D converter 16 and the memory control circuit 22, development processing using arithmetic processing executed in the image processing circuit 20 and the memory control circuit 22, and processing in which image data is read from the memory 30 and compressed in the compression/decompression circuit 32.

With the display changeover switch 66, a user can change display shown on the image display unit 28. This function enables reduction in power consumption at the time of shooting with an optical viewfinder 104 by blocking the supply of electric current to the image display unit 28, which includes a TFT and LCD.

The operation unit 70 includes various types of buttons, a touch panel, and a rotary dial. Examples include a menu button, a setting button, a macro-button, a multi-screen reproduction page-advance button, a flash setting button, and a single/continuous/self-timer shooting changeover button. Examples also include a menu moving + (plus) button, a menu moving − (minus) button, a reproduced image moving + (plus) button, a reproduced image moving − (minus) button, a shooting image quality selection button, an exposure correction button, and a date/time setting button.

The zoom switch unit 72 functions as a zoom operation unit through which a user inputs an instruction to change magnification of a captured image. Hereinafter, the zoom switch unit 72 is sometimes referred to as a zoom switch 72. The zoom switch 72 includes a telephoto switch for changing the shooting angle of view to a telephoto side and a widening switch for changing the shooting angle of view to a wide-angle side. A user can use the zoom switch 72 to instruct the zoom control unit 44 to change the shooting angle of view of the shooting lens 10 to trigger execution of optical zooming operation. Use of the zoom switch 72 also triggers an electronic zooming change in the shooting angle of view by image segmentation and pixel interpolation processing executed by the image processing circuit 20.

A power supply unit 86 includes a primary battery such as an alkaline battery, a secondary battery such as a nickel-cadmium (NiCd) battery, a nickel-metal-hydride (NiMH) battery, and a lithium (Li)-ion battery, and an alternating current (AC) adapter.

An interface 90 is an interface to a storage medium such as a memory card and a hard disk. A connector 92 connects the image processing apparatus 100 to a storage medium such as a memory card and a hard disk.

The optical viewfinder 104 enables a user to shoot an image without using the electronic finder function of the image display unit 28.

A communication unit 110 has various types of communication functions such as universal serial bus (USB) communication, Institute of Electrical and Electronics Engineers (IEEE) 1394 communication, local area network (LAN) communication, and wireless communication.

A connector 112, or an antenna 112 in the case of wireless communication, connects the image processing apparatus 100 to another apparatus via the communication unit 110.

The recording medium 200 is a recording medium such as a memory card and a hard disk.

The recording medium 200 includes a recording unit 202, an interface 204 to the image processing apparatus 100, and a connector 206 for connecting with the image processing apparatus 100. The recording unit 202 includes a semiconductor memory and a magnetic disk.

Each component of the image processing apparatus 100 described above may be hardware or may partially or entirely be a software module.

Figure 2:
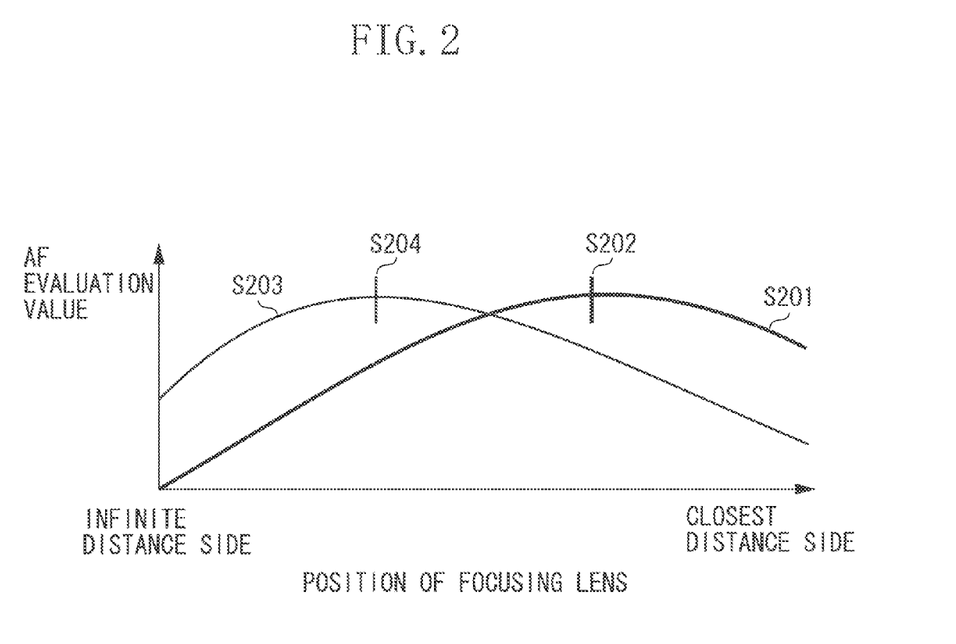
FIG. 2 illustrates a method for acquiring best focuses according to the present exemplary embodiment.

The following describes how the system control unit 50 acquires a distance map. The distance map shows the distribution of distance information on each area in an angle of view to be shot. While the distance map in the present exemplary embodiment is a matrix data table indicating distance information on each block in the angle of view, the distance map is not limited to the matrix data table. The following describes a measurement method using a contrast evaluation value as an example of a method for measuring a subject distance according to the present exemplary embodiment. First, M×N focusing areas are set with respect to the angle of view (image data is divided into blocks). While the focusing control unit 42 moves the focusing lens, the focusing control unit 42 calculates for each focusing area an AF evaluation value indicating the contrast of image data output from the image sensor 14. The AF evaluation value is either output from the image processing circuit 20 or obtained by arithmetic processing in the system control unit 50 based on image data or the output from the image processing circuit 20. From the obtained AF evaluation value of each focusing area with respect to a position of the focusing lens, the position of the focusing lens at which the evaluation value becomes highest (best in-focus position) is obtained for each focusing area. This corresponds to distance information (focus information) about a subject distance of each area. In other words, the distance map herein is M×N peak position information. In the present exemplary embodiment, M×N is 6×6. FIG. 2 is a view illustrating best in-focus positions, where the position of the focusing lens is measured along the horizontal axis and the AF evaluation value is measured along the vertical axis. In the present exemplary embodiment, the AF evaluation value is a quantified contrast of signals obtained by applying a band pass filter to live images that are sequentially output from the image sensor 14 at a predetermined frequency. When the focusing lens is moved from an infinite distance side to a closest distance side, the AF evaluation value of an object at a close distance is as shown by a curve S201, and the best in-focus position (maximum value) thereof is a position S202. On the other hand, the AF evaluation value of a background at a far distance is as shown by a curve S203, and the best in-focus position thereof is a position S204, which is closer to the infinite distance side than that of the object.

A method for acquiring distance information about subject distance for each area is not limited to the above-described method. Examples of a method for measuring a subject distance by comparing two or more images in the same angle of view with different in-focus positions include a method of estimating a distance based on an edge difference and a method using a depth-from-defocus (DFD) approach. Aside from the image sensor 14, a focusing sensor for measuring distance based on a phase difference may be provided. Pupil-divided pixels, whose focus is detectable using a phase difference, may be included in the pixel array of the image sensor 14 to measure a distance based on output from the pixels for focus detection. Any of the above methods can be a distance information acquisition method.

Figure 3A:
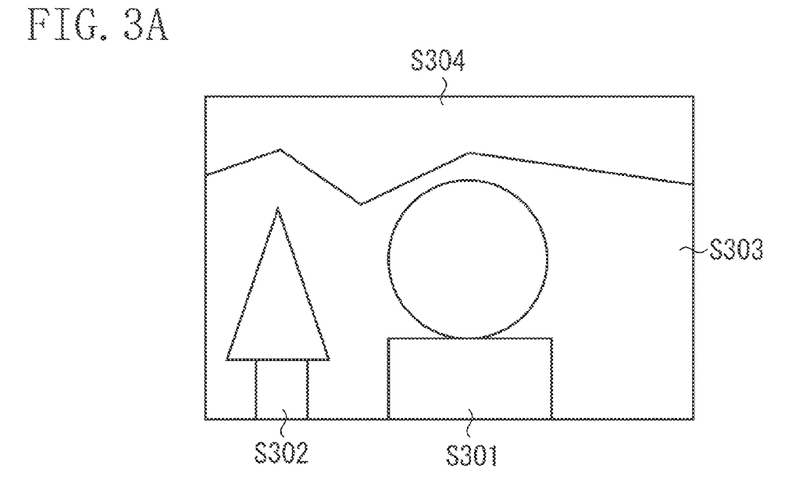
FIGS. 3A, 3B, 3C, 3D, 3E, and 3F illustrate a method for obtaining a distance map according to the present exemplary embodiment.

In addition to the distance map acquired by the subject distance measuring unit, in the present exemplary embodiment, composition information about compositions of images is acquired from image data in the angle of view to generate more appropriate distance information. FIG. 3A is a composition to be shot, including a person S301, a tree S302 existing in a background, a mountain and ground S303, and a sky S304.

Figure 3B:
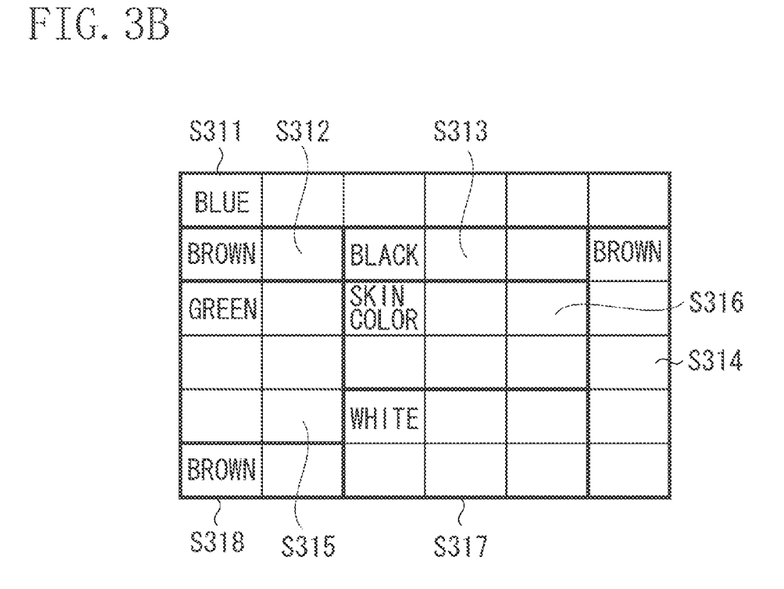

In FIG. 3B, an average value of color-difference signals (color signals) and an average value of luminance signals are calculated for each area formed by dividing the composition into blocks, whereby information about the composition is obtained. The composition is divided into blocks such that the composition is divided into six equal parts vertically and six equal parts horizontally as an example. Starting from the upper left block, a color-difference average value and a luminance average value of each block are sequentially compared with those of an adjacent block to determine differences from those of the adjacent block. If differences between a block and an adjacent block are small, then the blocks are determined to be highly similar and combined together as the same group. As a result, a blue area S311, a brown area S312, a black area S313, a brown area S314, a green area S315, a skin color area S316, a white area S317, and a brown area S318 are obtained.

Figure 3C:
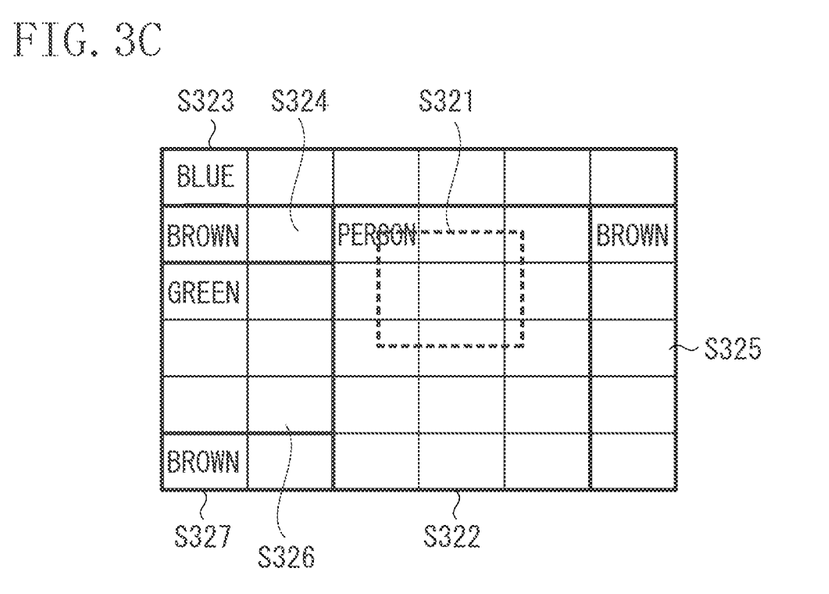

In FIG. 3C, the composition information in FIG. 3B is corrected using face information acquired from the face detection circuit included in the image processing circuit 20. When an area S321 is determined as a face area, the black area S313 corresponding to hair, the skin color area S316 corresponding to a face, and the white area S317 corresponding to a body are combined together as a person area S322. A method of setting the person area S322 based on the face area S321 is not limited to the foregoing method. For example, the person area S322 may be set by combining areas using a combining method that is not based on colors. For example, an area with a predetermined size that corresponds to a body area may be set around the face area S321 with the direction of the face taken into consideration, and a grouped area which is partially or entirely included in the set area may be combined with the face area S321 to obtain the person area S322. Further, a blue area S323, a brown area S324, a brown area S325, a green area S326, and a brown area S327 are obtained.

Figure 3D:
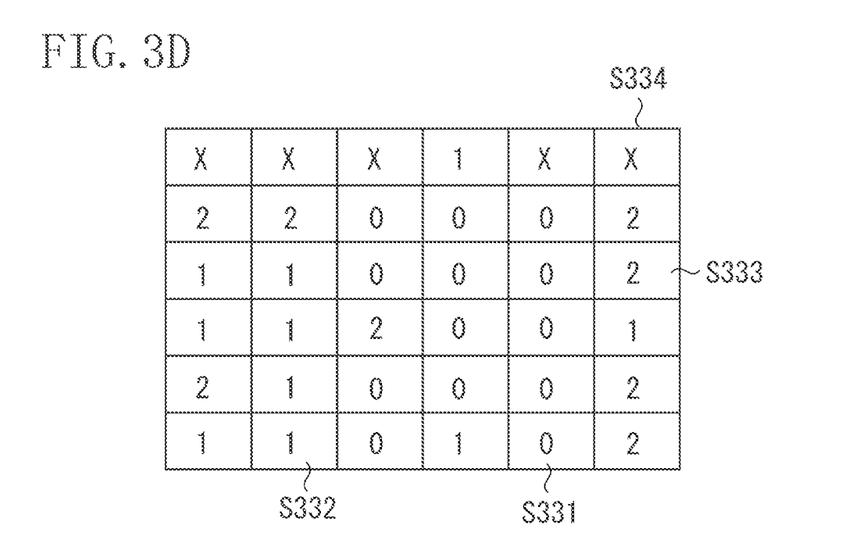

FIG. 3D illustrates focus information acquired by an autofocusing operation. For the sake of simplicity, the focus information is divided into blocks such that the focus information is divided into six equal parts vertically and six equal parts horizontally in the same manner as the composition information in FIG. 3B. FIG. 3D illustrates absolute values of a difference between a reference in-focus position and a best in-focus position of each block. An in-focus position of a main object area is referred to as the reference in-focus position. An area S331 indicates blocks with an absolute value of a difference of 0. An area S332 indicates blocks with an absolute value of a difference of 1, the blocks whose best in-focus positions are slightly different from the reference in-focus position. An area S333 indicates blocks with an absolute value of a difference of 2, the blocks whose best in-focus positions are far from the reference in-focus position. Note that "x" in an area S334 indicates that either the AF evaluation value cannot be measured due to low contrast or only a less-reliable evaluation value is obtained; in other words, "x" indicates an area for which an appropriate best in-focus position is not obtained.

Figure 3E:
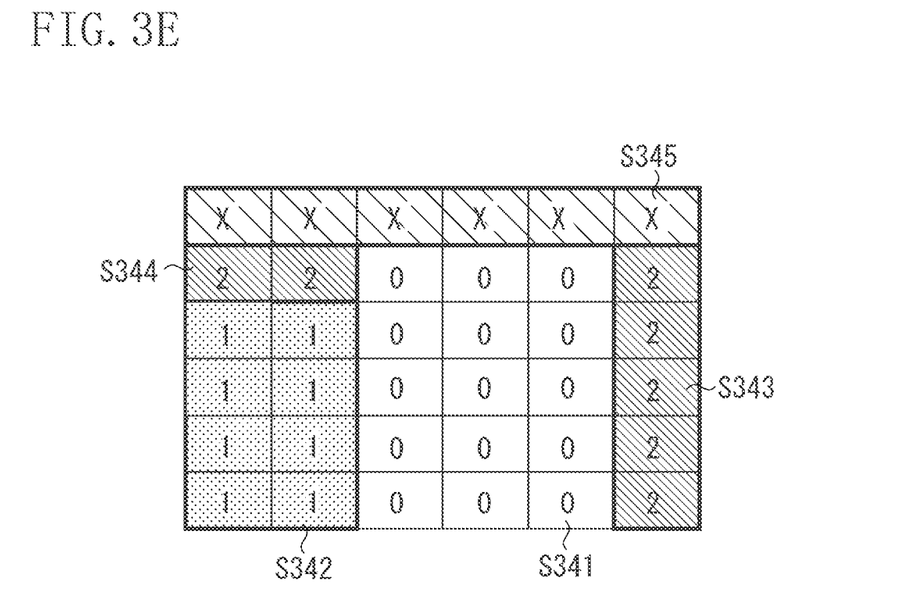

FIG. 3E illustrates a view in which the composition information corrected in FIG. 3C and the focus information in FIG. 3D are merged together. As to a method of merging, isolated blocks in the composition information and isolated blocks in the focus information are removed, and then blocks of the same in-focus position are combined together. An area S341 is a person area, i.e., a main object area, on which no blurring processing is to be executed. In an area that corresponds to the area S341 in FIG. 3E, for example, a block at the third row from the left and the fourth line from the top with an absolute value of a difference of 2 is determined as an isolated point, and the absolute value thereof is replaced by that of a surrounding area, i.e., by an absolute value of a difference of 0, to be grouped with the surrounding area (area on which no blurring processing is to be executed). A block at the fourth row from the left and the sixth line from the top with an absolute value of a difference of 1 is also determined as an isolated point, and grouped with an area with an absolute value of a difference of 0 (area on which no blurring processing is to be executed). Similarly, the green area S326 and the brown area S327 are determined to have the same in-focus position and form an area S342 on which weak blurring processing is to be executed. The brown area S343, the brown area S344, and the blue area S345 are areas on which strong blurring processing is to be executed.

Figure 3F:
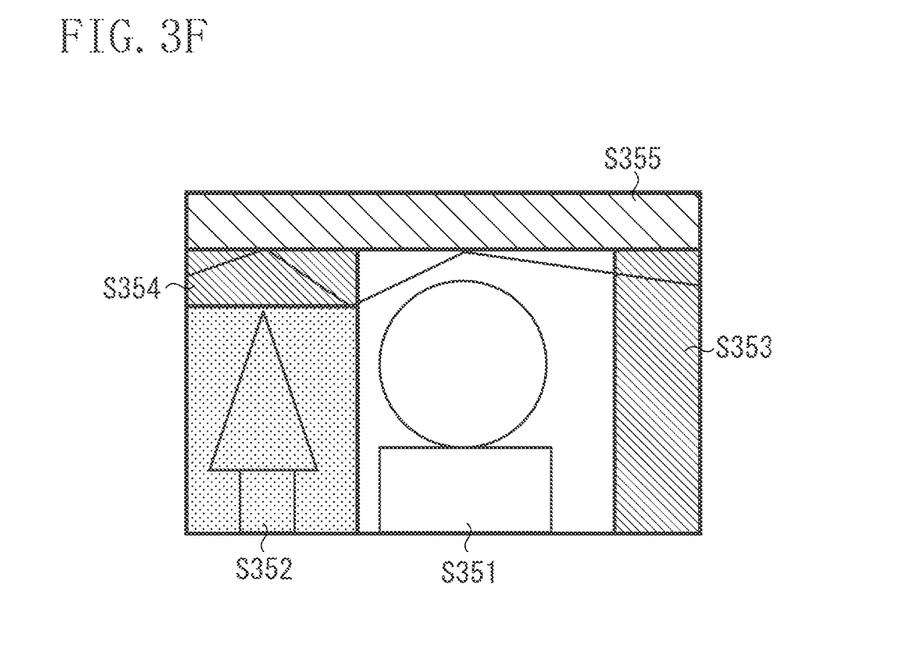

As a result of the foregoing, a blurring processing map illustrated in FIG. 3F is obtained in which the image data is divided into an object area and background areas (multilevel) other than the object area. A main object area S351 is an area on which no blurring processing is to be executed. An area S352 is an area on which weak blurring processing is to be executed. Areas S353, S354, and S355 are areas on which strong blurring processing is to be executed. Areas of each blurring intensity form a single continuous area.

In the present exemplary embodiment, whether blurring processing is to be executed is determined using the obtained blurring processing map. For example, when reference threshold values for the execution of blurring processing are set such that a threshold value of a difference from the reference in-focus position is set to 1 and a threshold value of the number of blocks in the background areas is set to 10, the number of blocks exceeding the threshold value of the difference in FIG. 3E is 15, and, therefore, the blurring processing is to be executed. On the other hand, when the threshold value of a difference from the reference in-focus position is set to 2, the number of blocks exceeding the threshold value of the difference is 7, which does not exceed the threshold value of 10. Accordingly, it is determined that no blurring processing is to be executed. This determination may be executed based on the focus information (subject distance information) alone instead of the blurring processing map.

While the blurring intensity has multiple layers of strong blurring and weak blurring in the present exemplary embodiment, the processing may be executed with two layers, i.e., with or without blurring processing. Alternatively, the processing may be executed with multiple layers of blurring intensity of four or more levels.

Figure 4A:
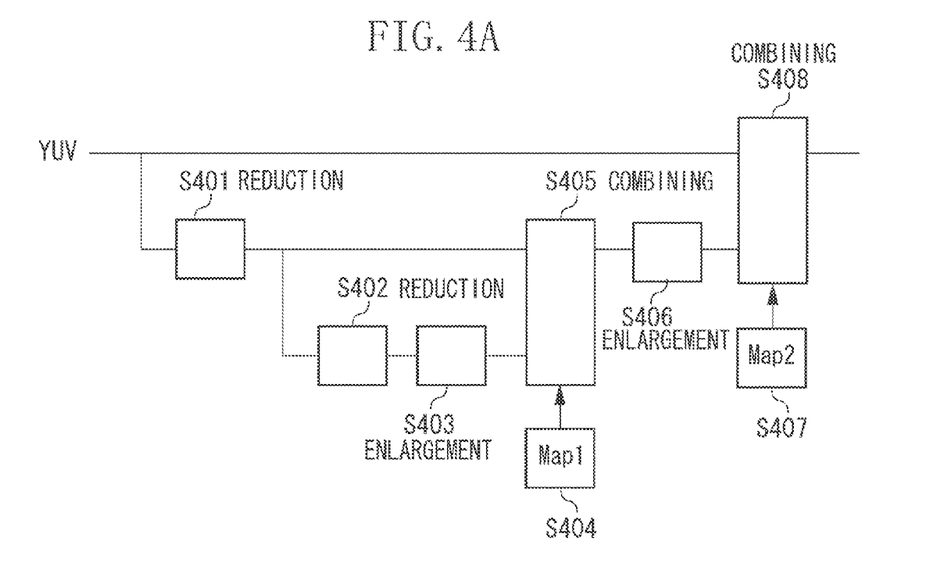
Figure 4B:
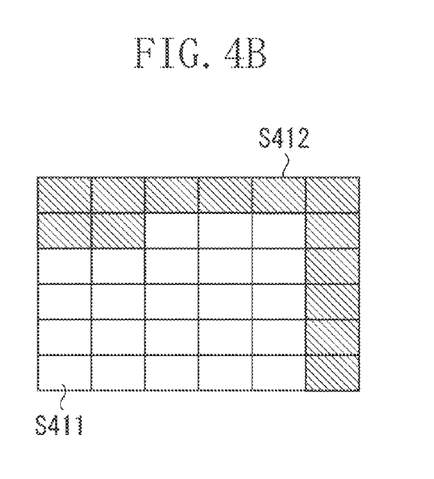
Figure 4C:
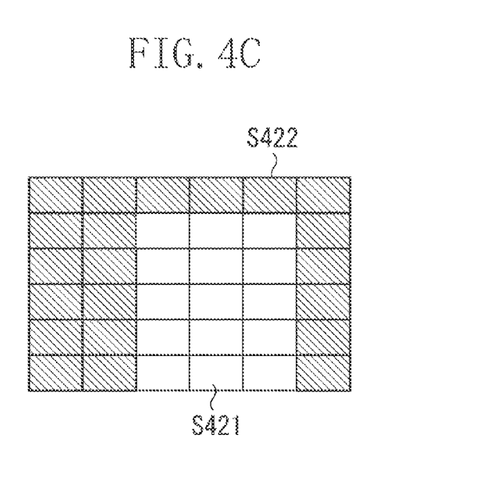

The following describes the blurring processing and combining processing with reference to FIGS. 4A, 4B, and 4C. FIGS. 4 A, 4B, and 4C are views illustrating a flow of data for generating a final image with a blurred background. The processing is executed by the image processing circuit 20.

As an input, a YUV (luminance, color-difference signal) image is input and subjected to first reduction in S401 to obtain a weakly-blurred image. At this time, a prefilter is used to prevent high-frequency signals from aliasing. In S402, the image is subjected to second reduction to obtain a strongly-blurred image. The obtained images are then enlarged in S403 to the size of an output image of S401 and then combined in S405. At this time, the images are combined using a combining map (Map1) S404. In the case of combining the images of the distance map in FIG. 3F, the Map1 S404 is as shown in FIG. 4B. A white area S411 corresponds to the weakly-blurred image which is output in S401. The black area S412 corresponds to the strongly-blurred image which is output in S402. The white area S411 in FIG. 4B corresponds to the areas with absolute values of 0 and 1 in the focus information in FIG. 3E and corresponds to the areas S341 and S342. The remaining area corresponds to the black area S412. The images are then enlarged in S406 to the size of the original YUV image and then combined in S408. At this time, the images are combined using a combining map (Map2) S407. In the case of combining the images of the distance map in FIG. 3F, the Map2 S407 is as illustrated in FIG. 4C. A white area S421 is the main object area on which no blurring processing is executed, and corresponds to the original YUV image. A black area S422 corresponds to the image formed by combining the weakly-blurred image and the strongly-blurred image in S408. The white area S421 in FIG. 4C corresponds to the areas with an absolute value of 0 in the focus information in FIG. 3E and corresponds to the area S341. The remaining area corresponds to the black areas S422.

Accordingly, the area S351 in the distance map in FIG. 3F is an area on which no blurring processing is executed. The area S352 is a weakly-blurred area, and the remaining areas S353 to S355 are strongly-blurred areas.

Figure 5:
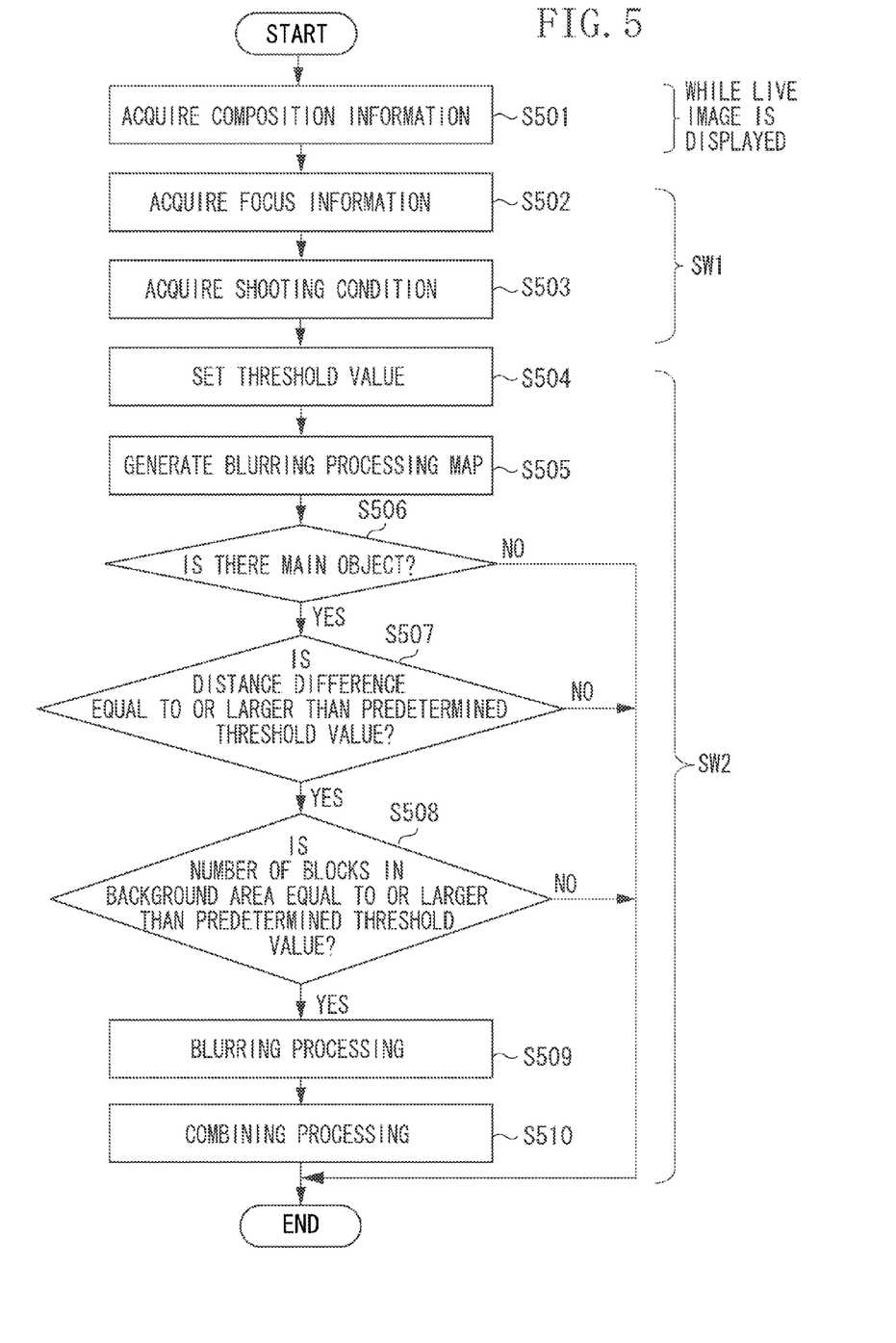
FIG. 5 is a view illustrating an operation flow according to the present exemplary embodiment.

The following describes an operation flow according to the present exemplary embodiment with reference to FIG. 5.

The acquisition of composition information in step S501 is an operation to be executed while live images are displayed as described above. This operation is executed repeatedly at a constant frequency. Divided blocks of live images are grouped using color-difference signals, luminance signals, and face detection information. This corresponds to the information acquisition and generation processing illustrated in FIGS. 3B and 3C.

The acquisition of focus information in step S502 is an operation to acquire best focus information for each area of divided blocks. This operation is executed when the shutter switch SW1 is pressed. Although the operation can be executed while live images are displayed, since defocused images would be displayed, the operation is executed when the shutter switch SW1 is pressed in the present exemplary embodiment. The operation corresponds to the information acquisition and generation processing illustrated in FIG. 3D.

An acquisition of shooting conditions in step S503 is an operation to acquire blurring-related conditions such as focal length and aperture value at the time of setting shooting conditions of actual shooting.

The following operation is executed when the shutter switch SW2 is pressed.

In the threshold value setting operation in step S504, a threshold value to be used in the distance difference determination in step S507 is determined. The threshold value may be a variable depending on shooting conditions and in-focus position of a main object. Further, a threshold value to be used in the area size determination in step S508 is also determined. The threshold value may be a variable depending on an intensity of blurring processing.

In step S505, the composition information acquired in step S501 and the focus information acquired in step S502 are merged together to generate a blurring processing map. Correction of the blurring processing map is also executed by removing isolated blocks and using the face information. This operation corresponds to the information acquisition and generation processing illustrated in FIGS. 3E and 3F.

In step S506, whether there is a main object is determined based on the blurring processing map acquired in step S505. If it is determined that there is a main object (Yes in step S506), then the processing proceeds to step S507. If it is determined that there is no main object (No in step S506), then the processing is ended without executing blurring processing.

In the distance difference determination in step S507, whether a distance difference between a main object and a background is equal to or larger than a predetermined threshold value is determined. If it is determined that the distance difference is equal to or larger than the predetermined threshold value (Yes in step S507), then the processing proceeds to step S508. On the other hand, if it is determined that the distance difference is smaller than the predetermined threshold value (No in step S507), then the processing is ended without executing blurring processing.

The threshold value of the distance difference may be a variable depending on focal length and distance of the main object.

In the area size determination in step S508, whether the number of blocks in the background area is equal to or larger than a predetermined threshold value is determined. If it is determined that the number of blocks in the background area is equal to or larger than the predetermined threshold value (Yes in step S508), then the processing proceeds to step S509. On the other hand, if it is determined that the number of blocks in the background area is smaller than the predetermined threshold value (No in step S508), the processing is ended without executing blurring processing. The blurring processing in step S509 and the combining processing in step S510 are executed by executing the reduction/enlargement processing and then combining as described above with reference to FIGS. 4A, 4B, and 4C. As to the blurring processing, while the reduction/enlargement processing and the combining processing are executed in combination in the present exemplary embodiment, the reduction/enlargement processing and the combining processing may be executed separately. Further, while the blurring processing is executed using the reduction/enlargement and the prefilter in the present exemplary embodiment, the blurring processing may be realized by use of a multitap secondary filter or primary filter.

As to the acquisition of composition information, while composition information is acquired from live images in step S501 in the present exemplary embodiment, the acquisition may be executed again on an actually-captured image obtained by use of the shutter switch SW2. As to each determination, while the determination of whether there is a main object in step S506, the determination of a distance difference between the main object and the background in step S507, and the determination of the number of blocks in the background area in step S508 are executed after the shutter switch SW2 is pressed in the present exemplary embodiment, the foregoing determinations may be executed before the shutter switch SW2 is pressed.

As the foregoing describes, in the present exemplary embodiment, blurring processing information (blurring processing map) is generated for each area to execute blurring processing based on subject distance information and composition information on each area in the angle of view that are obtained by analyzing shooting scenes. This enables effective execution of the blurring processing according to a shooting scene.

The exemplary embodiment is applicable not only to apparatuses that are mainly aimed at shooting such as digital cameras but also to any apparatus that includes an imaging apparatus or is to be externally connected to an imaging apparatus such as mobile phones, personal computers (laptop, desktops, tablets, etc.), and game apparatuses. Accordingly, as used herein, the term "imaging apparatus" is intended to encompass any electronic apparatuses having shooting functions.

According to the exemplary embodiment, shooting scenes are analyzed to execute effective blurring processing according to the shooting scenes.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2012-285263 filed Dec. 27, 2012, which is hereby incorporated by reference herein in its entirety.

What is claimed is:

1. An image processing apparatus comprising:
   a detection unit configured to detect an object from image data;
   a blurring processing unit configured to execute blurring processing on a background area in the image data, the background area being other than an object area corresponding to the object detected by the detection unit; and
   a control unit configured to control the blurring processing unit to execute the blurring processing when the background area has a first size, and not to execute the blurring processing when the background area has a second size smaller than the first size.

2. The image processing apparatus according to claim 1, wherein the control unit calculates a size of the background area and controls whether to execute the blurring processing according to the size of the background area.

3. The image processing apparatus according to claim 1, wherein the control unit controls whether to execute the blurring processing according to a distance difference in subject distance between the object area and the background area.

4. The image processing apparatus according to claim 1, wherein a distance difference in subject distance between the object area and the background area is greater than a threshold value, and wherein the control unit causes execution of the blurring processing on the background area if a size of the background area is larger than a predetermined size.

5. The image processing apparatus according to claim 3, further comprising a distance information acquisition unit configured to acquire distance information on subject distance of each area of the image data divided into a plurality of areas,
   wherein the distance difference is obtained based on the distance information.

6. The image processing apparatus according to claim 5, further comprising an imaging unit configured to convert an optical image entering from an optical system including a focusing lens to output image data,
   wherein the distance information acquisition unit acquires a contrast evaluation value for each area of the image data output from the imaging unit while moving the focusing lens, and acquires the distance information based on the contrast evaluation value.

7. The image processing apparatus according to claim 5, wherein if subject distance of an area of the image data is either immeasurable or less reliable, the area is indicated as an area that corresponds to neither the object area nor the background area in the distance information.

8. The image processing apparatus according to claim 5, further comprising a composition information acquisition unit configured to acquire composition information in which the image data is divided into a plurality of areas based on similarities in luminance signals and color signals of the image data,
wherein the distance difference is obtained based on the distance information and the composition information.

9. The image processing apparatus according to claim 8, wherein the control unit compares the distance information with the composition information to generate information about an area that is an isolated point, based on information about a surrounding area, and obtains the distance difference.

10. The image processing apparatus according to claim 5, further comprising:
   an imaging unit configured to shoot an object to output image data; and
   an instruction unit configured to give an instruction to control at least one of focusing, exposure, and white balance according to a user operation,
wherein the distance information is obtained according to the instruction from the instruction unit.

11. A method of image processing comprising:
detecting an object from image data;
executing blurring processing on a background area in the image data, the background area being other than an object area corresponding to the detected object; and
executing the blurring processing when the background area has a first size, and not executing blurring processing when the background area has a second size smaller than the first size.

12. A non-transitory computer-readable storage medium storing computer executable instructions that cause a computer to execute the method according to claim 11.

* * * * *